Figure 1:
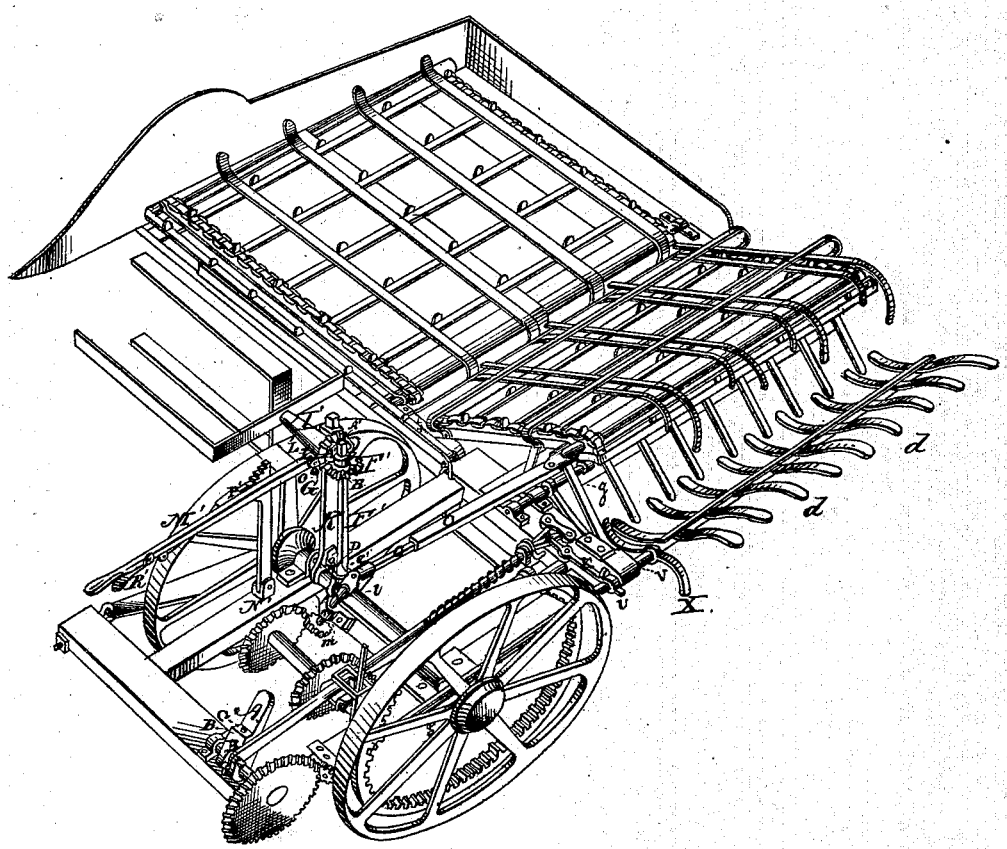

2 Sheets--Sheet 1.

H. J. SILVERNALE.
Harvesters.

No. 139,199.    Patented May 20, 1873.

Witnesses,
Thomas O. Cook,
George W. Muggatt.

Inventor:
Harvey J. Silvernale.

H. J. SILVERNALE.
Harvesters.
No. 139,199.
2 Sheets--Sheet 2.
Patented May 20, 1873.
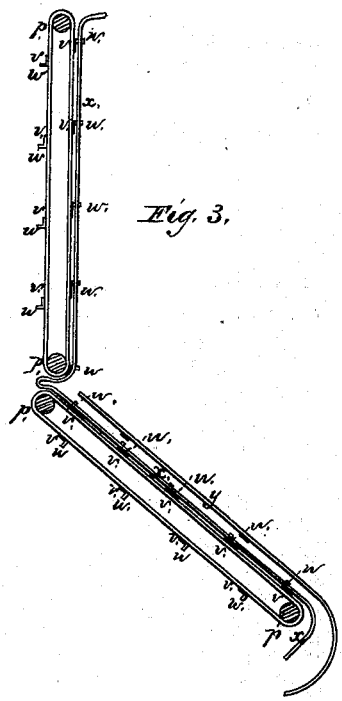
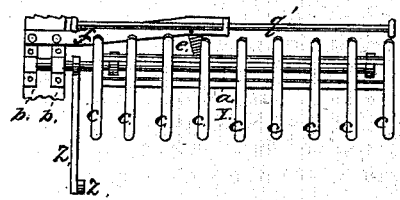
Fig. 4.
Fig. 3.
Fig. 2.
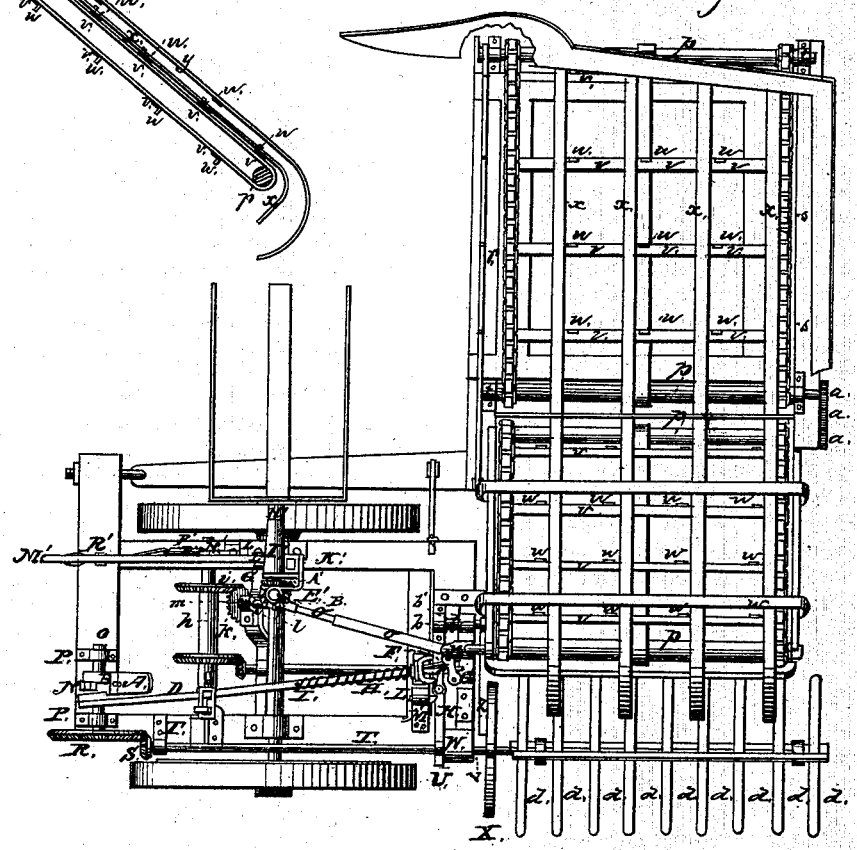
Witnesses.
Thomas O. Cook,
George W. Myggatt
Inventor.
Harvey J. Silvernale

UNITED STATES PATENT OFFICE.

HARVEY J. SILVERNALE, OF GOLDEN LAKE, WISCONSIN.

IMPROVEMENT IN HARVESTERS.

Specification forming part of Letters Patent No. 139,199, dated May 20, 1873; application filed January 3, 1873.

*To all whom it may concern:*

Be it known that I, HARVEY J. SILVERNALE, of Golden Lake, in the county of Waukesha and State of Wisconsin, have invented certain Improvements on Side Droppers for Reapers, of which the following is a specification:

Of the drawing hereof, Figure 1 is a perspective view of reaper whereof my improvements form part. Fig. 2 is a horizontal plan; Fig. 3, a section plan of horizontal and inclined conveyers; Fig. 4, plan of wing making part of the dropper.

The several parts of the reaper are indicated as follows: A, the foot-lever, which can be used at the will of the operator; B, clutch working in and with the foot-lever, to act on the ratchet-wheel; C, spiral spring controlling the clutch; D, shaft with a coiled spring thereon; E, notch in the back of the shaft D, for a lever; F, a flat spring attached to the end of the shaft D; G, a guide, with rollers, controlling the spring F; H, coiled spring around the shaft D, acting with the foot-lever; I, stop-pin in shaft D, for the spring H; K, lever, one end fitting in the notch E, the other end holding and allowing the revolving of the dropper-shaft; L, spring-bolt in box M, acting with lever K; N, ratchet-wheel in the foot-lever A, acted upon by the clutch B; O, a short shaft to which motion is given by the action of the foot-lever, the ratchet-wheel, and clutch; P P, boxes of shaft O; R, beveled cog-wheel on the end of shaft O; S, beveled pinion on the end of the dropper-shaft; T, dropper-shaft; U, stop on the dropper-shaft, held in place and relieved by the action of the lever K; V, a spring-bolt in box W, for holding the stop on the dropper-shaft in place; X, curved arms on the dropper-shaft for giving motion to the inclined wing Y; Z, curved arm with roller, one end of this arm being attached to the shaft *a* of the inclined wing; *b b*, boxes for the shaft *a*. The motion of the inclined wing is given by the revolution of the curved arms on the dropper-shaft, these arms acting on the roller of the curved arm attached to the shaft *a*; *c c*, straight slats attached to the wing-shaft; *d d*, curved slats revolving with the dropper-shaft. These slats receive the grain-stalks from the inclined conveyer and hold them until relieved by the revolution of the dropper-shaft. *e*, coiled spring holding the inclined wing in position; *f*, bar-rest for the spring *e*, and for supporting the upper end of the inclined conveyer; *g*, the frame; *h*, sleeve on pinion-wheel shaft, revolving with the shaft when in gear; *i*, beveled cog-wheel attached to the sleeve; *k*, beveled cog-wheel working with wheel *i*; *l*, shaft of wheel *k*; *m*, box of that shaft; *o*, extension-shaft, one part sliding within the other; *n n*, universal joint at each end thereof; *p p*, rollers with cogs *s s*, to fit in links of endless chains *r r*; *t t*, boxes for rollers *p* at the lower end of the inclined conveyers; *u u*, spur-wheels on back end of rollers for conveyers; *v v*, movable slats for horizontal and inclined conveyers; *w w*, hooks on slats and chains for carrying the grain-stalks to the dropper; *x x*, stationary slats for horizontal and inclined conveyers; *y y*, slats on inclined conveyer for protecting the passing grain from being disturbed by the wind.

The Reel.

A', beveled cog-wheel revolving with the axle of the reaper; B', beveled cog-wheel on upright shaft; C', box on axle for journal of upright shaft; D', guide for upright shaft in backward or forward motion; E', upright shaft; F', beveled cog-wheel and box near upper end of upright shaft; G', beveled cog-wheel on inner end of shaft for reel; H', shaft for reel; I', box for reel-shaft, reel-post, and reel-gearing; K' reel-post, the top working backward or forward—the hinge on the axle of reaper; L', hinge on reel-post box for end of lever; M', lever-bar for raising or lowering the reel, the box, and the bevel-gearing; N', movable standard with bottom hinge and ratchet-head; O', fulcrum or pivot for lever; P', coiled spring-clutch on lever-bar, for holding the lever-bar in position when the reel is either raised or lowered; R', lever attached to lever-bar for controlling spring-clutch.

From this statement in detail of the location and use of the several parts of this machine, the construction and operation of the whole will readily be understood. Some parts of the machine are not referred to, as they are common to reapers, and other parts usual to reapers are not shown by the drawing.

It should be noticed that there are two motions of the foot-lever A. One motion operates the spring-clutch, the shaft in connection, the coiled spring, the notch in the back end of the shaft, and the vibrating lever which holds and relieves the stop U on the dropper-shaft. The other motion is by pressing down the foot-lever still further, which operates the spring-clutch, the ratchet-wheel that revolves the shaft O, and the bevel-gearing, and also the dropper-shaft, the curved arm and the curved slats, and, also, the stop on the dropper-shaft acting in connection with the lever.

It should also be noticed that the curved arm on the dropper-shaft acts on the roller and curved arm attached to the inclined wing-shaft, and allows the grain-stalks to be dropped for bundles as required by the driving man.

I claim—

1. The combination of the hinged platform, endless apron thereon, and elevator with the universal jointed extension-shaft and spur-wheels $u\ u\ u$, for driving said platform and elevator, substantially as and for the purpose set forth.

2. The combination of the foot-lever A, provided with spring-pawl, shaft O, provided with ratchet N, beveled wheels R and S, and dropper-shaft T, for the purpose of rotating the dropper, substantially as set forth.

3. The combination of the foot-lever A, locking-bar D, provided with springs H and F, and notch E with the locking-lever K, for the purpose of holding the dropper in position while the gavel is being gathered, substantially as set forth.

This specification signed this 12th day of October, 1872.

HARVEY J. SILVERNALE.

Witnesses:
THOMAS D. COOK,
GEORGE W. MYGATT.